(12) United States Patent
Kaddouh

(10) Patent No.: US 11,981,289 B2
(45) Date of Patent: May 14, 2024

(54) VEHICLE LADDER

(71) Applicant: NISSAN NORTH AMERICA, INC., Franklin, TN (US)

(72) Inventor: Sam Kaddouh, West Bloomfield, MI (US)

(73) Assignee: Nissan North a, nc., Franklin, TN (US)

( * ) Notice: Subject to any disclaimer, the term of this patent is extended or adjusted under 35 U.S.C. 154(b) by 280 days.

(21) Appl. No.: 17/085,883

(22) Filed: Oct. 30, 2020

(65) Prior Publication Data

US 2022/0134955 A1    May 5, 2022

(51) Int. Cl.
*B60R 3/00*     (2006.01)
*B60R 9/04*     (2006.01)
*E06C 5/04*     (2006.01)
*E06C 5/24*     (2006.01)

(52) U.S. Cl.
CPC .............. *B60R 3/007* (2013.01); *B60R 3/005* (2013.01); *B60R 9/04* (2013.01); *E06C 5/04* (2013.01); *E06C 5/24* (2013.01)

(58) Field of Classification Search
CPC ..... B60R 3/007; B60R 9/04; B60R 2011/004; E06C 5/04; E06C 1/12; E06C 7/183; E06C 9/06
See application file for complete search history.

(56) References Cited

U.S. PATENT DOCUMENTS

| | | | | |
|---|---|---|---|---|
| 2,378,678 | A * | 6/1945 | Anderson | B60R 3/007 280/165 |
| 2,727,793 | A * | 12/1955 | Ricciuti | B25H 5/00 182/129 |
| 2,848,150 | A * | 8/1958 | Tans | B25H 5/00 182/222 |
| 2,973,052 | A * | 2/1961 | Miller | B60R 3/007 182/150 |
| 3,006,434 | A * | 10/1961 | Rich | B63B 27/14 182/206 |
| 3,605,943 | A * | 9/1971 | Beaudet et al. | E06C 5/04 182/127 |
| 4,431,082 | A * | 2/1984 | Bott | B60R 3/005 182/127 |
| 4,492,286 | A * | 1/1985 | Lemire | E06C 5/02 182/127 |
| 4,548,294 | A * | 10/1985 | Ruda | E06C 7/08 182/206 |
| 5,111,909 | A * | 5/1992 | Liu | B60R 3/007 280/165 |
| 5,255,757 | A * | 10/1993 | Horowitz | E06C 1/52 182/127 |
| D359,134 | S * | 6/1995 | Toews | D25/64 |
| 5,645,140 | A * | 7/1997 | Mouneimneh | E06C 1/125 182/195 |

(Continued)

*Primary Examiner* — Jessica L Laux
*Assistant Examiner* — Kathleen M. McFarland
(74) *Attorney, Agent, or Firm* — Global IP Counselors, LLP

(57) ABSTRACT

A vehicle includes a vehicle body, a vehicle roof rack component and a vehicle ladder. The vehicle body has a roof body part and a side body part. The side body part defines a wheel well of the vehicle. The vehicle roof rack component is installed to the roof body part. The ladder is detachably installed to the vehicle body. The ladder extends from the roof body part and over the side body part to the wheel well.

5 Claims, 3 Drawing Sheets

(56) References Cited

U.S. PATENT DOCUMENTS

| | | | | |
|---|---|---|---|---|
| 5,788,321 A * | 8/1998 | McHorse | B60R 3/007 | 296/180.1 |
| 6,234,273 B1 * | 5/2001 | Moore | E06C 7/44 | 182/201 |
| 6,315,078 B1 * | 11/2001 | Kumher | E06C 9/12 | 182/39 |
| 6,378,654 B1 * | 4/2002 | Ziaylek, Jr. | E06C 5/02 | 182/127 |
| 6,401,861 B1 * | 6/2002 | Marszalek | B60R 3/02 | 182/86 |
| 6,457,558 B1 * | 10/2002 | Ehnes | B60R 3/007 | 280/165 |
| D479,884 S * | 9/2003 | Berryman | D25/64 | |
| 6,971,478 B2 * | 12/2005 | Bareket | B60R 3/00 | 182/95 |
| 7,066,299 B1 * | 6/2006 | Fleming | E06C 7/48 | 182/127 |
| D541,431 S * | 4/2007 | Donovan | D25/64 | |
| 7,992,681 B2 * | 8/2011 | Anderson | E06C 7/182 | 182/106 |
| 8,215,453 B2 * | 7/2012 | Mickens | E06C 1/38 | 182/195 |
| 8,573,673 B1 * | 11/2013 | Puglisi, Sr. | E06C 5/26 | 182/127 |
| 8,827,038 B2 * | 9/2014 | Salzman | E06C 5/22 | 182/98 |
| 8,844,676 B2 * | 9/2014 | Filkowski | E06C 1/12 | 280/165 |
| 9,463,748 B2 * | 10/2016 | Presley | B60R 9/042 | |
| 9,500,029 B1 * | 11/2016 | Mullins | E06C 5/04 | |
| 9,821,716 B1 * | 11/2017 | Hernandez | B60R 3/007 | |
| 9,914,396 B1 * | 3/2018 | Scott | B60R 3/02 | |
| 9,945,179 B1 * | 4/2018 | Joldersma | E06C 5/02 | |
| 10,030,446 B2 * | 7/2018 | Badillo | B62D 65/16 | |
| 10,112,542 B2 * | 10/2018 | Downing | B60R 3/02 | |
| 10,118,556 B2 * | 11/2018 | Pine | E06C 5/02 | |
| 10,294,720 B2 * | 5/2019 | Nguyen | E06C 7/082 | |
| D882,119 S * | 4/2020 | Badillo | D25/64 | |
| 10,738,532 B2 * | 8/2020 | Badillo | B60R 3/005 | |
| 10,822,875 B1 * | 11/2020 | Hailey | E06C 5/32 | |
| 10,836,321 B1 * | 11/2020 | Clark | B60R 3/007 | |
| 10,843,631 B1 * | 11/2020 | Honeysett | B60R 3/02 | |
| D906,546 S * | 12/2020 | Badillo | D25/64 | |
| 10,927,599 B2 * | 2/2021 | Nakari | E06C 5/24 | |
| D934,768 S * | 11/2021 | Rogers | D25/64 | |
| 11,377,040 B2 * | 7/2022 | Salter | E05B 85/04 | |
| 11,414,928 B2 * | 8/2022 | Allan | B65D 25/02 | |
| 2004/0069566 A1 * | 4/2004 | Bareket | B60R 3/00 | 182/127 |
| 2006/0108179 A1 * | 5/2006 | Sieb | B60R 3/005 | 182/127 |
| 2006/0157301 A1 * | 7/2006 | Embretsen | E06C 5/02 | 182/150 |
| 2006/0201747 A1 * | 9/2006 | Walton | E06C 1/36 | 182/206 |
| 2006/0226624 A1 * | 10/2006 | Chen | B60R 3/007 | 280/165 |
| 2006/0254859 A1 * | 11/2006 | Redekas | E06C 7/44 | 182/204 |
| 2006/0272895 A1 * | 12/2006 | Lavoie | B60R 3/02 | 182/127 |
| 2007/0090139 A1 * | 4/2007 | McKenzie | B60R 9/0423 | 224/310 |
| 2008/0202850 A1 * | 8/2008 | Anderson | E06C 7/48 | 182/106 |
| 2008/0277199 A1 * | 11/2008 | Castonguay | E06C 1/36 | 182/127 |
| 2009/0159367 A1 * | 6/2009 | Ortiz Perez | E06C 7/44 | 182/201 |
| 2010/0012431 A1 * | 1/2010 | Ehnes | E06C 5/20 | 182/150 |
| 2010/0089698 A1 * | 4/2010 | Brodsack | E06C 5/04 | 182/127 |
| 2010/0122871 A1 * | 5/2010 | Gottlinger | E06C 5/02 | 182/106 |
| 2011/0186383 A1 * | 8/2011 | Ambriz | E06C 1/36 | 182/200 |
| 2012/0318178 A1 * | 12/2012 | Hanks | B60P 3/08 | 108/20 |
| 2015/0197198 A1 * | 7/2015 | Egner | E06C 1/125 | 182/77 |
| 2016/0258214 A1 * | 9/2016 | Ambriz | E06C 5/02 | |
| 2017/0021772 A1 * | 1/2017 | Pine | E06C 5/02 | |
| 2017/0050571 A1 * | 2/2017 | Badillo | B60R 3/005 | |
| 2017/0144605 A1 * | 5/2017 | Kelly | E06C 5/04 | |
| 2018/0170272 A1 * | 6/2018 | Bleazard | B60R 9/0423 | |
| 2018/0290596 A1 * | 10/2018 | Fukushima | B60R 3/005 | |
| 2018/0340371 A1 * | 11/2018 | Georges | E06C 7/42 | |
| 2018/0354424 A1 * | 12/2018 | Maiorana | E06C 7/003 | |
| 2019/0135186 A1 * | 5/2019 | Hagedorn | B60B 7/0066 | |
| 2021/0245668 A1 * | 8/2021 | Tertuliani | B60R 9/058 | |
| 2022/0073004 A1 * | 3/2022 | Salter | B60P 7/14 | |
| 2022/0126758 A1 * | 4/2022 | Salter | B60J 5/042 | |
| 2022/0134955 A1 * | 5/2022 | Kaddouh | E06C 5/02 | 182/127 |
| 2022/0136326 A1 * | 5/2022 | Kaddouh | E06C 5/24 | 224/326 |
| 2022/0212606 A1 * | 7/2022 | Hoinka | B60R 9/058 | |
| 2022/0289112 A1 * | 9/2022 | Parack | B60R 3/005 | |
| 2023/0014982 A1 * | 1/2023 | Florence | E06C 5/02 | |

* cited by examiner

VEHICLE LADDER

BACKGROUND

Field of the Invention

The present invention generally relates to a vehicle ladder. More specifically, the present invention relates to a vehicle ladder that is removably mounted to a vehicle body part.

Background Information

Vehicles, particularly large vehicles or work vehicles, can be equipped with a ladder or a service ladder that provides the vehicle's operator access with from the ground to upper portions (e.g., the roof) of the vehicle. The ladder enables the vehicle's operator to climb up the ladder's body and onto the roof area or a service platform to perform various service/maintenance operations, such as servicing, cleaning or accessing storage equipment.

SUMMARY

In view of the state of the known technology, one aspect of the present disclosure is to provide a vehicle comprising a vehicle body, a vehicle roof rack component and a vehicle ladder. The vehicle body has a roof body part and a side body part. The side body part defines a wheel well of the vehicle. The vehicle roof rack component is installed to the roof body part. The ladder is detachably installed to the vehicle body. The ladder extends from the roof body part and over the side body part to the wheel well.

In view of the state of the known technology, another aspect of the present disclosure is to provide a ladder configured to be mounted to a vehicle. The ladder comprises a pair of siderails having a first end and a second end. The first end defines a top end of the ladder. The second end defines a bottom end of the ladder. The top end of the ladder has a first attachment part configured to be attached to a vehicle body component. The ladder further comprises a second attachment part 56 configured to contact a vehicle wheel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
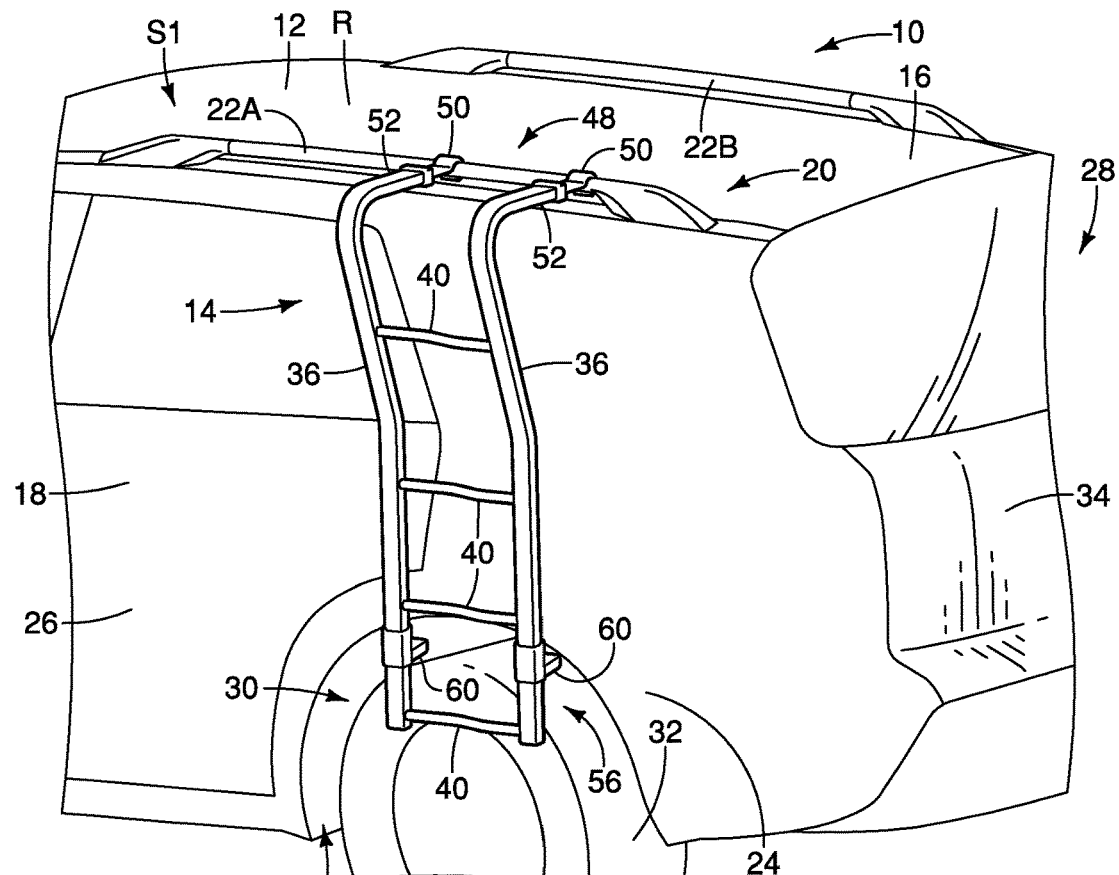
FIG. 1 is a perspective view of a rear portion of a vehicle equipped with a ladder in accordance with an illustrated embodiment.

Referring initially to FIG. 1, a portion of a vehicle 10 is illustrated in accordance with an embodiment. The vehicle 10 comprises a vehicle body 12 and a ladder 14 that is provided to the vehicle body 12. As shown, the vehicle 10 is equipped with the vehicle ladder 14. Therefore, the vehicle 10 of the illustrated embodiment includes the ladder 14 that is provided to the vehicle body 12. While the vehicle 10 is illustrated as being a sports utility vehicle, it will be apparent to those skilled in the vehicle field from this disclosure that the vehicle 10 can alternatively be another type of vehicle, as a service vehicle that is equipped with the ladder 14 in accordance with the illustrated embodiment.

The vehicle body 12 has a vehicle roof R that is defined by a roof panel body structure 16 that defines a roof surface 51 of the vehicle 10. In the illustrated embodiment, the roof panel body structure 16 can be roof panel or any other body structure that at least partially defines the vehicle's roof or roof surface 51. Therefore, the vehicle body 12 has a roof body part 16 (e.g., the roof panel body structure 16) that partially defines the vehicle roof R. As shown, the vehicle 10 further includes a side body part 18 that at least partially defines the side body of the vehicle. The ladder 14 is constructed and positioned with respect to the vehicle body 12 to enable the vehicle's 10 operator to access the vehicle's roof R, as will be further described below.

In the illustrated embodiment, the vehicle 10 further comprises a vehicle roof rack component 20 installed to the roof body part 16. In particular, the vehicle 10 includes a vehicle roof rack assembly that comprises a first roof rack rail 22A and a second roof rack rail 22B that are installed to opposite lateral sides of the vehicle roof R or the vehicle roof panel 16. The pair of roof rack rails 22A and 22B extend longitudinally along a lengthwise direction of the vehicle roof R. The roof rack rails 22A and 22B are each considered a vehicle roof rack component 20 of the vehicle roof rack assembly. In the illustrated embodiment, the vehicle roof rack component 20 includes either or both of the roof rack rails 22A and 22B. In particular, the ladder 14 is installed to one of the roof rack rails 22A and 22B in the illustrated embodiment. In particular, the ladder 14 is removably installed to either one of the roof rack rails 22A and 22B, as needed and/or desired. Therefore, the ladder 14 of the illustrated embodiment is detachably installed to the vehicle body 12 via the roof rail rails 22A and 22B. The roof rack rails 22A and 22B are conventional, hollow rails 22A and 22B and will not be further discussed.

In the illustrated embodiment, the side body part 18 is a quarter panel 24 of the vehicle 10. Therefore, the vehicle body 12 further includes a pair of quarter panels 24 (a driver's side quarter panel 24 shown in FIGS. 1 and 2). The quarter panels 24 extends from the vehicle roof R to an underside area S2 of the vehicle. The quarter panel 24 is part of the vehicle body 12 that defines a vehicle exterior surface extending between a rear door 26 and a rear storage area 28 of the vehicle 10. The quarter panel 24 typically wraps around a wheel well 30 (e.g., an underside area S2 of the fender) of the vehicle 10 that houses the vehicle's tires 32. The quarter panel 24 is conventional and can be made of sheet metal, fiberglass, carbon fiber, or fiber-reinforced plastic. The quarter panel 24 can alternatively include a trim piece for the vehicle 10 that is fitted over the wheel well 30. The trim piece is often installed to the quarter panel 24 along the perimeter of the wheel well 30 above the tire 32.

As seen in FIG. 1, the contours of the quarter panel 24 defines the wheel well 30 of the vehicle 10. Therefore, in the illustrated embodiment the side body part 18 defines a wheel well 30 of the vehicle 10. The wheel well 30 houses the tire 32 for the vehicle 10. Therefore, the vehicle 10 is illustrated as including the tire 32 that is housed in the wheel well 30.

In the illustrated embodiment, the ladder 14 sits on the tire 32 when the ladder 14 is installed to the vehicle 10. The ladder 14 is illustrated as being installed to the vehicle roof rack component 20 near the rear driver's side tire 32. However, it will be apparent to those skilled in the vehicle field from this disclosure that the ladder 14 can be alternatively attached such that the ladder 14 sits on either one of the passenger's side tire (not shown) or the front driver's side tire (not shown), as needed and/or desired. Therefore, While the ladder 14 is illustrated as being installed to the driver's side roof rack rail 22A, it will be apparent to those skilled in the vehicle field from this disclosure that the ladder 14 can be alternatively installed to the passenger's side roof rack rail 22B as needed and/or desired.

As shown, the vehicle 10 further includes a rear hatch 34 or a tailgate that at least partially defines the vehicle rear storage area 28 or the rear end of the vehicle 10. The rear hatch 34 is movable between open and closed positions to enable a user's access to vehicle's 10 interior storage from the vehicle rear end. The rear hatch 34 also extends from the vehicle roof R to the vehicle underside area S2 at a location that is offset of the side body part 18 (e.g., the quarter panel 24). Preferably, the rear hatch 34 is directly adjacent to the quarter panel 24 and is preferably aligned flush with the quarter panel 24 when the rear hatch 34 is in the closed condition.

Figure 2:
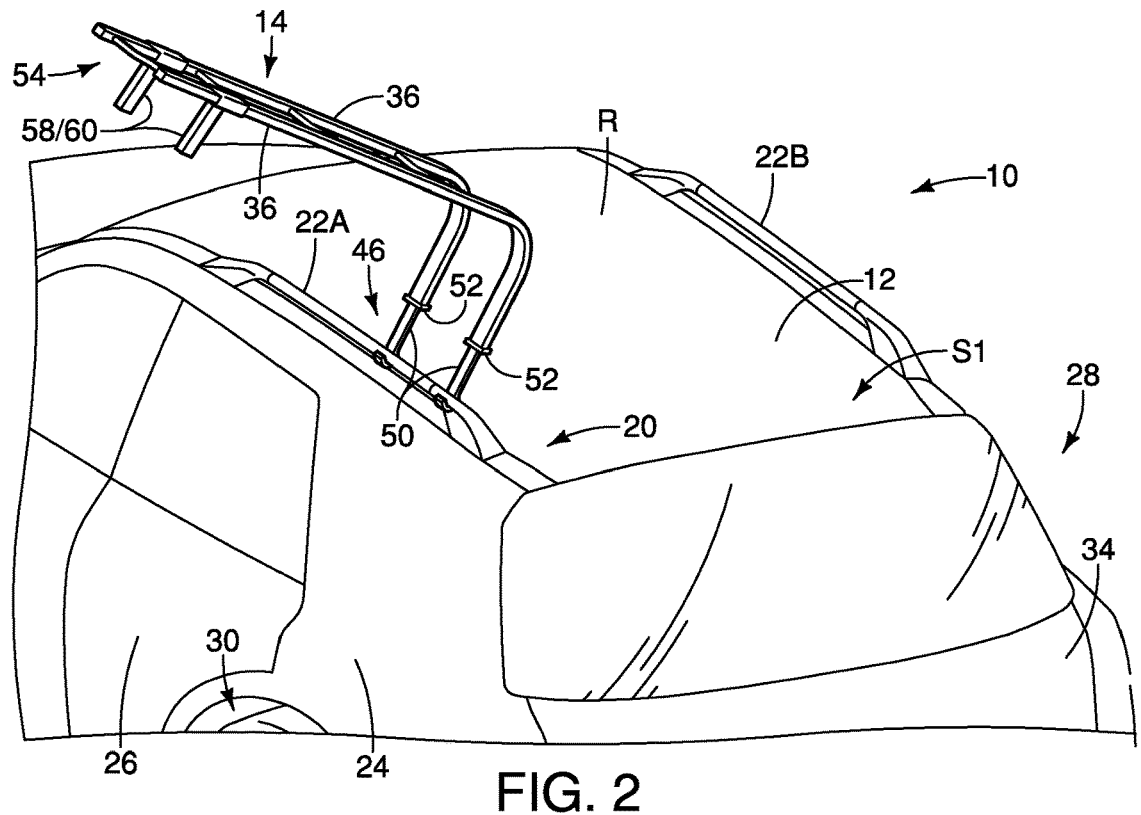
FIG. 2 is a perspective view of an upper portion of the vehicle equipped with the ladder.

When installed, the ladder 14 extends from the roof rack rail 22A over the quarter panel 24 to the wheel well 30. In particular, as shown in FIGS. 1 and 2, the ladder 14 is mounted to the quarter panel 24 of the vehicle 10 at a location offset of the vehicle's rear hatch 34. That is, the ladder 14 crosses the quarter panel 24 to extend from the roof rack rail 22A to the wheel well 30. In the illustrated embodiment, the ladder 14 preferably does not obstruct opening and closing of the rear hatch 34.

The ladder 14 is preferably provided at a location of the vehicle body 12 that is in the vicinity of the rear hatch 34 without obstructing the rear hatch 34 such that the ladder 14 is generally provided on the vehicle's rear storage area 28. As shown, the ladder 14 is positioned at the rear storage area 28 that is rearward of the vehicle's doors 26 and forward of the rear hatch 34. Alternatively speaking, the ladder 14 is mounted to the vehicle body 12 at a location that is closer to the rear hatch 34 than to a front end (not shown) of the vehicle 10.

Figure 3:
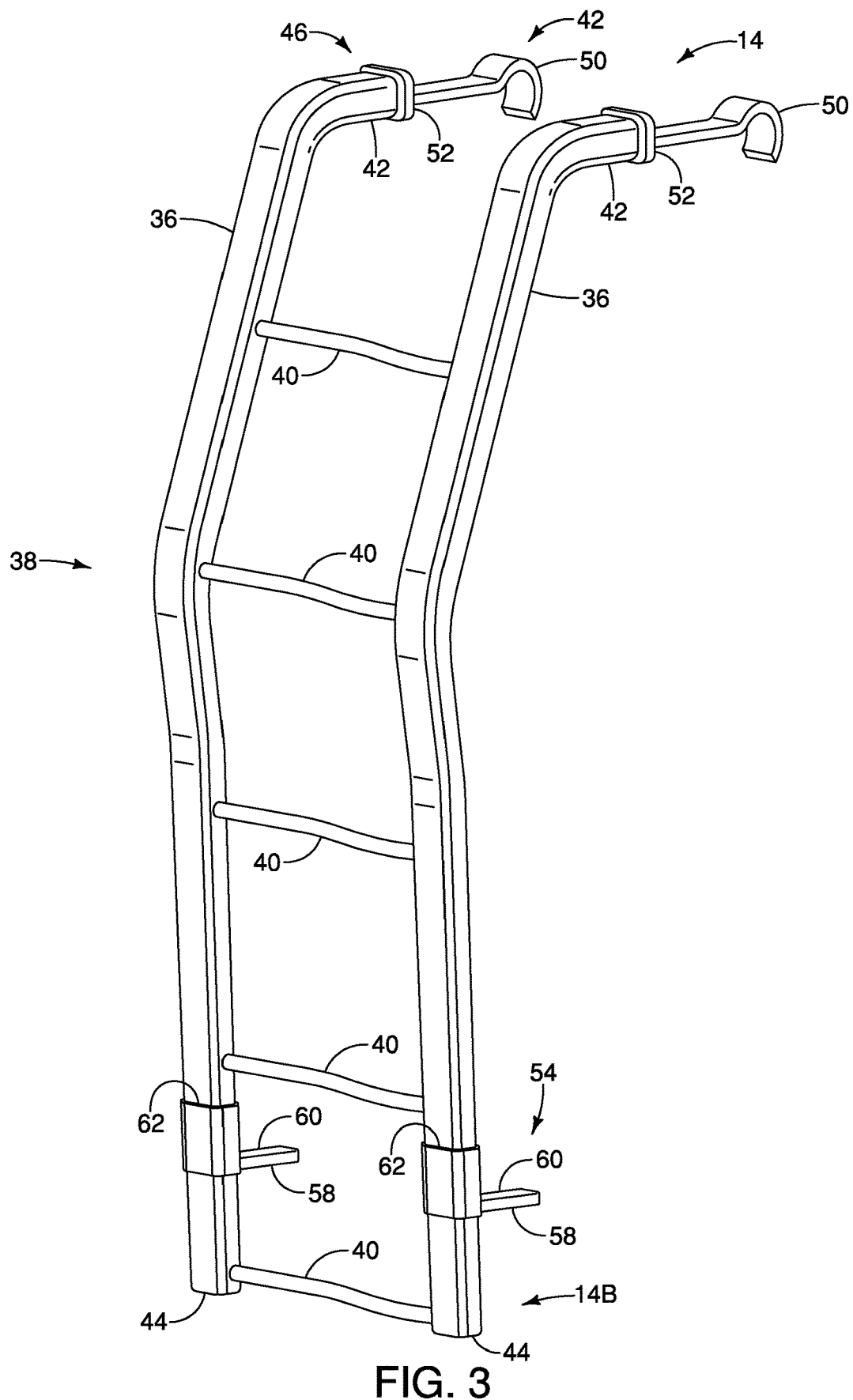
FIG. 3 is a perspective view of the ladder of FIGS. 1 and 2.

As best seen in FIG. 3, the ladder 14 includes a pair of siderails 36. The siderails 36 together define a longitudinal body 38 of the ladder 14. A longitudinal length of the longitudinal body 38 defines a longitudinal length of the ladder 14. The longitudinal body 38 crosses the quarter panel 14 of the vehicle body 12 as seen in FIG. 1. Alternatively speaking, the longitudinal body 38 overlaps over the quarter panel 24 when the ladder 14 is mounted to the vehicle body 12 so that a user can climb over the quarter panel 24 via the ladder 14 in order to access the vehicle roof R. The ladder 14 further includes a plurality of rungs 40 connected to the pair of siderails 36. The rungs 40 are positioned in succession between top and bottom end 14Bs of the ladder 14. The rungs 40 substantially define the lateral length of the ladder 14.

The siderails 36 have a first end 42 that includes a top end 14A of the ladder 14 and a second end 44 that includes a bottom end 14B of the ladder 14. The ladder 14 has a top portion 46 that is removably connected to the roof rack rail 22A. The top portion 46 has the top end 14A of the ladder 14 that connects the ladder 14 to the roof rack rail 22A. In particular, the top end 14A of the ladder 14 has a first attachment part 48 that is configured to be attached to the roof rack rail 22A. The first attachment part 48 extends from the top end 14A of the siderails 36. In other words, the first attachment part 48 is connected to the top end 14A of the siderails 36. As shown, the top portion 46 of the ladder 14 includes a pair of hooks 50 that are removably attached to the roof rack rail 22A. The first attachment part 48 of the ladder 14 comprises the hooks 50.

In particular, each of the siderails 36 has a hook 50 that is detachably attached to the roof rack rail 22A. Referring to FIG. 3, the first attachment part 48 includes a pair of hanger plates 52 that are welded to the respective top ends 14A of the siderails 36. The first attachment part 48 includes the hooks 50, each of the hooks 50 extend from one of the hanger plates 52. In the illustrated embodiment, the hanger plates 52, the hooks 50 and the top end 14A of the siderails 36 are preferably welded together so that the first attachment part 48 and the siderails 36 are integrally attached without need for external fasteners of fastening means such as threads, etc.

Preferably, the hooks 50, the hanger plates 52 and the siderails 36 are all made of metal and are integrally connected to each other such as by welding. In this way, the hooks 50 are preferably considered one-piece with the remainder of the ladder 14. However, it will be apparent to those skilled in the vehicle field from this disclosure that the hooks 50 and/or the hanger plates 52 can be attached to the top ends 14A of the siderails 36 via threads or fasteners as needed and/or necessary. The hooks 50 hook over the roof rack rail 22A so that the ladder 14 hinges at the top portion 46 with respect to the roof rack rail 22A, as seen in FIG. 2. Therefore, the hooks 50 enable the ladder 14 to hinge upwards and downwards towards and/or away from the vehicle body 12 during installation or storage of the ladder 14 as needed and/or necessary.

As seen in FIG. 3, the ladder 14 further includes a bottom portion 54 configured to contact the tire 32 that is positioned in the wheel well 30 of the vehicle 10. The bottom portion 54 has the bottom end 14B of the ladder 14. The bottom portion 54 additionally includes a second attachment part 56 of the ladder 14. Therefore, the ladder 14 further includes the second attachment part 56 located at the bottom portion 54 that is configured to contact the vehicle tire 32. In particular, when the ladder 14 is installed, the bottom portion 54 includes at least one projection 58 extending from the siderails 36 in a direction towards the wheel well 30, as best seen in FIG. 1. As best seen in FIG. 3, the projections 58 extend from the siderails 36 in a direction transverse to the siderails 36. In particular, the projection 58 includes a pair of identical projections 58 that are feet 60 for the ladder 14. The feet 60 are configured to sit on the tire 32 positioned in the wheel well 30. The feet 60 define the second attachment part 56 of the ladder 14 that positions the ladder 14 with respect to the vehicle body 12 via the tire 32.

In the illustrated embodiment, the pair of feet 60 are telescopically movable along the siderails 36. That is, each of the feet 60 includes an opening 62 for receiving one of the siderails 36 so that the feet 60 are adjustable along the siderails 36. Therefore, the feet 60 are adjustably movable along the siderails 36 between the first and second ends 42 and 44 of the ladder 14. This way, the ladder 14 can be adjustable to accommodate different types of vehicles having different sizes of quarter panel 24, the wheel well 30 and tire 32($s$). While not shown, it will be apparent to those skilled in the vehicle field from this disclosure that the ladder 14 can include a pair of set screws for setting a position of the feet 60 along the siderails 36. Set screws are conventional and will not be further discussed herein. Alternatively, it will be apparent to those skilled in the vehicle field from this disclosure that the feet 60 can be attached to the siderails 36 via other attachment mechanisms instead of telescopically.

Figure 4:
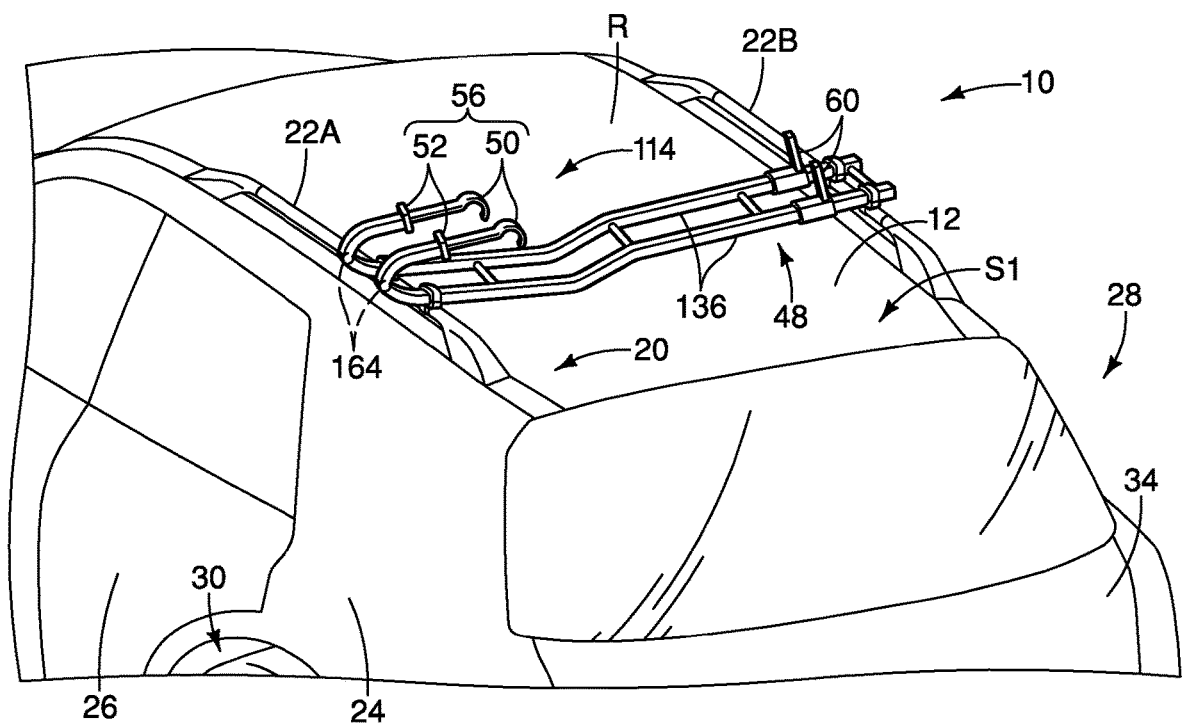
FIG. 4 is a side view of a top of the vehicle equipped with a modified ladder installed thereon.

Referring now to FIG. 4, a modified ladder 114 that can be implemented with the vehicle is illustrated. The modified ladder 114 includes a pair of siderails 136 and a plurality of rungs 40. The modified ladder 114 additionally includes a first attachment part 48 that is identical to the first attachment part 48. The modified ladder 114 includes a second attachment part 56 that is identical to the second attachment part 56. Basically, the modified ladder 114 is identical to the ladder 14 except that the modified ladder 114 includes a pair of siderails 136 that can include an additional hinge 164 at a body of the siderails 36. Due to the similarities between the modified ladder 114 and the ladder 14 of the main embodiment, components of the modified ladder 114 that are identical to corresponding components of the ladder 14 will receive the same reference numeral. All modified components will receive the same reference numerals are corresponding components of the ladder 14 but increased by 100.

In particular, the modified ladder 114 includes the additional hinge 164 that is located along the siderails 136. The additional hinge 164 is located between the first and second attachment parts 48 and 56. Preferably, as shown, the additional hinge 164 is located closer to the first attachment part 48 than to the second attachment part 56. The siderails 136 are configured to move or fold with respect to each other at the additional hinge 164 so that the ladder 14 can be stored on the vehicle roof R to the roof rack rails 22A and 22B. Therefore, the siderails 136 can be made of separate components that are movably fixed together at the additional hinge 164. Preferably, the additional hinge 164 is a torque or friction hinge. That is the additional hinge 164 is configured and made so that there is some resistance against movement so that siderails 36 are not swaying along the additional hinge 164. Additionally, the ladder 14 can include one or more mount clamps 166 for securing the ladder 14 to the roof rack rails 22A and 22B.

GENERAL INTERPRETATION OF TERMS

In understanding the scope of the present invention, the term "comprising" and its derivatives, as used herein, are intended to be open ended terms that specify the presence of the stated features, elements, components and/or groups but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle ladder. Accordingly, these terms, as utilized to describe the present invention should be interpreted relative to a vehicle equipped with the vehicle ladder.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
   a vehicle body having a roof body part and a side body part, the side body part defining a wheel well of the vehicle;
   a vehicle roof rack component installed to the roof body part; and
   a ladder detachably installed to the vehicle body, the ladder extending from the roof body part and over the side body part to the wheel well, the ladder having a first end defining a top portion of the ladder that includes a pair of hooks that are removably attached to the vehicle roof rack component, the ladder further having a second end that extends into the wheel well when the ladder is installed to the vehicle body, the second end defining a bottom portion that includes a pair of feet, each of the feet having a wheel contact surface that contacts a top tread surface of a vehicle wheel positioned in the wheel well when the ladder is installed to the vehicle body, the pair of feet being telescopically movable along siderails of the ladder so that the ladder can accommodate vehicle bodies of different sizes, each of the feet having a body and an end that together define the wheel contact surface that is a planar surface.

2. The vehicle according to claim 1, wherein the side body part is a quarter panel of the vehicle.

3. The vehicle according to claim 1, wherein the vehicle roof rack component is a roof rack rail.

4. The vehicle according to claim 1, wherein the ladder includes a pair of siderails, each of the siderails having one of the pair of hooks that is detachably attached to the vehicle roof rack component.

5. A ladder configured to be mounted to a vehicle, the ladder comprising:
   a pair of siderails having a first end that includes a top end of the ladder and a second end that includes a bottom end of the ladder, the top end of the ladder having a first attachment part configured to be attached to a vehicle body component, the top end of the ladder includes a pair of hooks that are configured to be removably attached to the vehicle roof rack component and a second attachment part including a pair of feet that are configured to sit on a wheel positioned in the wheel well, each of the feet being telescopically movable along one of the siderails so that the ladder can accommodate vehicle bodies of different sizes, each of the feet having a wheel contact surface that contacts a top tread surface of the vehicle wheel positioned in the wheel well when the ladder is installed to the vehicle body, each of the feet having a body and an end that together define the wheel contact surface that is a planar surface.

* * * * *